United States Patent [19]

Heinzen et al.

[11] Patent Number: 5,660,104

[45] Date of Patent: Aug. 26, 1997

[54] APPARATUS AND METHOD FOR REMOVING RIND FROM SPHERIODAL FRUITS AND VEGETABLES

[76] Inventors: Alan Heinzen, 2482 Howell La., Gilroy, Calif. 95020; Charles Shimmel, 26155 Rinconda Dr., Carmel Valley, Calif. 93924; Rudi Groppe, 7531 Santa Barbara St., Gilroy, Calif. 95020; Eric A. Davidson, 235 Crescent Way, Salinas, Calif. 93906

[21] Appl. No.: 620,369

[22] Filed: Mar. 22, 1996

[51] Int. Cl.[6] .............................. A23N 7/00; A47J 17/16
[52] U.S. Cl. .............................. 99/595; 99/591; 99/590; 426/482
[58] Field of Search .......................... 99/589, 590, 591, 99/594, 595, 596; 426/482

[56] References Cited

U.S. PATENT DOCUMENTS

| | | | |
|---|---|---|---|
| 3,744,408 | 7/1973 | Palis | 99/595 |
| 4,982,499 | 1/1991 | Fortin | 30/123.5 |
| 5,097,758 | 3/1992 | Fresh | 99/590 |
| 5,105,734 | 4/1992 | Foxcroft et al. | 99/541 |
| 5,105,735 | 4/1992 | Gonzalvo | 99/590 |
| 5,133,250 | 7/1992 | Del Ser Gonzalez | 99/591 |
| 5,251,377 | 10/1993 | Ho | 30/123.5 |
| 5,279,035 | 1/1994 | Cohen et al. | 30/294 |
| 5,325,593 | 7/1994 | Chen | 30/279.6 |

*Primary Examiner*—Reginald Alexander
*Attorney, Agent, or Firm*—Jeffrey P. Aiello; Leary, Titus & Aiello

[57] ABSTRACT

An apparatus and method for removing rind from a spheroidal food article, such as a melon is provided. The apparatus includes a carriage assembly having revolving spindles that retain a melon on its axis and revolve the melon on its equator. The spindles are aligned with a first axis when the carriage assembly is in an initial position. A cutting assembly is located adjacent to the carriage assembly. The cutting assembly includes reciprocating knifes that are positioned on either side of the melon and aligned with the equator thereof. The knifes are configured with a blade dimensioned to extend through the rind of the melon, without extending substantially into the flesh of the melon. A rotating assembly is provided for rotating the carriage assembly between the initial position and a completed position, and parallel to the first axis. The spindles revolve the melon on its equator, so that the knifes initially remove rind from the melon along the equator thereof. The rotating assembly rotates the carriage assembly toward the completed position for rotating the melon about its axis, so that the knifes can continuously remove rind from the melon as the carriage assembly is rotated toward the completed position. Thus, the entire rind is substantially removed from the melon. Additionally, knife members that extend beneath cups of the spindles may be provided. The knife members are simultaneously rotated through each pole of the melon to disengage the melon from the spindles, without removing excessive flesh from the melon.

20 Claims, 4 Drawing Sheets

APPARATUS AND METHOD FOR REMOVING RIND FROM SPHERIODAL FRUITS AND VEGETABLES

BACKGROUND OF THE INVENTION

1. Field of the Invention

The present invention relates generally to food process apparatus, and more particularly, to an improved apparatus and method for removing rind from spheroidal fruits and vegetables, and particularly melons.

2. Description of Related Art

A number of different machines and implements have been disclosed in the prior art for processing fruits and vegetables. Most machines and implements are either particularly designed for home use or industrial applications. Implements adapted for home use are typically designed for hand use or for placement of the implement on a suitable surface, such as the countertop in a kitchen.

The machines designed for industrial use are usually somewhat large and may be configured for automated processing of food thereby. A number of different common fruits and vegetables are processed by such industrial machinery, for packing or canning of the fruits and vegetables, prior to taking them to the marketplace. However, it is well known that fruits and vegetables are many different shapes and sizes. Thus, several different machines are provided for separately processing each of the fruits and vegetables. Therefore, processing of a particular fruit, such as removing the skin from a peach, is usually performed by a particular machine, for maximizing the processing speed of the machine.

An industrial machine for processing fruits and vegetables is disclosed in U.S. Pat. No. 5,097,758, to Fresh, which is directed to a fruit and vegetable peeler. The disclosed peeler includes a tong assembly having flexible grater plates resiliently connected across spaced apart joints of the assembly. The tong assembly is mounted to a support plate having a food article receiving aperture formed therethrough. The grater plates are positioned for access through the aperture. In use, a pronged chuck spins a food article, such as a carrot. The food article is lowered through the aperture, between the grater plates. The tong assembly has tong handles connected to the grater plates for closing the plates. The plates are closed to abrasively engage food article to remove a surface layer therefrom.

U.S. Pat. No. 5,105,734, to Foxcroft et al., discloses a peeler for peeling oranges. The peeler comprises a cylindrical member for cutting a major portion of the orange, by plunging the member into the orange. The cut portion of the orange resides within the cutting member, with the orange peel residing outside the cutting member. A moveable member is provided to push the cut portion of the orange out of the cutting member. Ends of the orange are peeled by a slicing means. The slicing means can remove the ends of the orange either before or after the orange is cut by the cutting member. A disadvantage of the disclosed peeler, is that food articles cut thereby are cylindrical, due to the cylindrical cutting member. Since oranges, as well as other food articles, are not cylindrical the disclosed peeler may either remove an excessive portion of the orange's flesh, or not sufficiently remove the peel, or both.

U.S. Pat. No. 5,325,593, to Chen, discloses a hand operated double-blade peeler; U.S. Pat. No. 5,279,035, to Cohen et at., is directed to a kitchen utensil for peeling fruits and vegetables; and U.S. Pat. No. 5,251,337, to Ho, discloses a hand operated vegetable and fruit peeler and peel collector.

Although the devices disclosed in the above enumerated prior art references have improved features, they fail to disclosed all of the advantageous features achieved by the present invention.

OBJECTS OF THE INVENTION

It is therefore an object of the present invention to provide an apparatus and method for removing rind from spheroidal fruits and vegetables, and particularly melons;

It is another object of the present invention to provide an apparatus for removing rind from melons that is substantially automated;

It is a further object of the present invention to provide an apparatus for removing rind from melons that removes the rind of the melon without removing an excessive amount of the flesh of the melon;

It is yet another object of the present invention to provide an apparatus and method for removing rind from melons that is capable of removing the rind from melons having substantially different circumferences and weights;

It is a still further object of the present invention to provide an apparatus and method for removing rind from melons that removes substantially the entire rind from the melon;

It is still another object of the present invention to provide an apparatus and method for removing rind from melons that is capable of repeatedly removing the rind of the melon without removing an excessive amount of the flesh of the melon and without necessitating adjustment of the apparatus;

It is a further object of the present invention to provide an apparatus and method for removing rind from melons that provides consistent positioning of melons processed thereby for further processing of the melons; and It is another object of the present invention to provide a method for removing rind from spheroidal fruits and vegetables, and particularly melons that inhibits harm from coming to individuals processing the melons.

SUMMARY OF THE INVENTION

These and other objects and advantages of the present invention are achieved by providing an improved apparatus and method for removing rind from spheroidal fruits and vegetables, and particularly melons. The apparatus of the present invention includes a carriage assembly having revolving means that are aligned with a first axis, when the carriage assembly is in an initial position. The revolving means retains a melon on its axis and engages the melon, so that the axis of the melon is aligned with the revolving means. The revolving means revolves the melon on its equator for removing the rind from the melon.

The apparatus includes a cutting assembly located adjacent to the carriage assembly. The cutting assembly includes knife means that comprise a pair of diametrically opposed knifes adapted to be positioned on either side of the melon and aligned with the equator thereof. The knife means each include a cutting head comprising a blade and a skid member. The blade is dimensioned to extend through the rind of the food article, without extending substantially into the flesh of the food article. The skid contacts the rind of the food article, to prevent the blade from extending into the flesh for preventing excessive flesh from being removed from the food article. The knife means can be adjusted with different distances therebetween to accommodate melons of different diameters. Preferably the knife means can be adjusted to accommodate melons having diameters ranging from approximately 4 inches to approximately 10 inches.

The present invention further includes rotating means for rotating the carriage assembly between the initial position and a completed position, and parallel to the first axis. The rotating means includes drive means coupled to the revolving means and to the carriage assembly. The drive means drives the revolving means at the first velocity and drives the carriage assembly at a second velocity. The first velocity is substantially greater than the second velocity, so that the melon revolves quickly on its equator as the carriage assembly is slowly rotated to the completed position.

In use, the revolving means begins to revolve the melon on its equator as the knife means extends into the rind of the melon, for initially removing rind from the melon along its equator. The rotating means rotates the carriage assembly from the initial position toward the completed position. The rotating means rotates the carriage assembly from the initial position to an intermediate position. As the melon is rotated about its axis from the initial position to the intermediate position, the melon revolves on its axis with the knife means continuously removing rind from the melon. Thus, when the carriage assembly reaches the intermediate position, substantially the entire rind of the melon has been removed, without removing excessive flesh therefrom.

Once the intermediate position is reached by the carriage assembly, the knife means are withdrawn from the melon. The rotating means then rotate the carriage assembly to the completed position for disengaging the melon from the revolving means. A pair of knife members located adjacent the revolving means are used to disengaged the melon from the revolving means. Each knife member rotates through a pole of the melon for removing the rind from the pole without removing excessive flesh from the melon. The melon is then disengaged for further processing. The rotating means then rotates the carriage assembly back to the initial position for receiving the next melon to have its rind removed.

Additionally, the revolving means may include a plurality of skewer members affixed to cup members thereof. The skewers extend into the rind of the pole of the melon for coupling the melon to the revolving means. Disengaging means, such as spring-loaded plates for example, are also provided in the cups. The spring-loaded plates are released outwardly from the cups, once the knife members have disengaged the melon from the revolving means, to remove rind remaining in the cups.

The method of the present invention first comprises positioning a melon between in the revolving means, when the revolving means are aligned with the first axis as previously discussed. The melon is then engaged by the revolving means, with the revolving means centering the melon thereon, so that the axis of the melon is aligned with the revolving means. The knife means are then positioned on the melon in alignment with its equator. The revolving means then revolves melon, for removing rind from the melon. The melon is then rotated about its axis toward a second axis, such as by rotating the carriage assembly toward the completed position. The melon is rotated toward the second axis until substantially the entire rind is removed from the melon. The melon is then disengaged from the revolving means as discussed. The carriage assembly is then rotated back to the initial position.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein.

Figure 1:
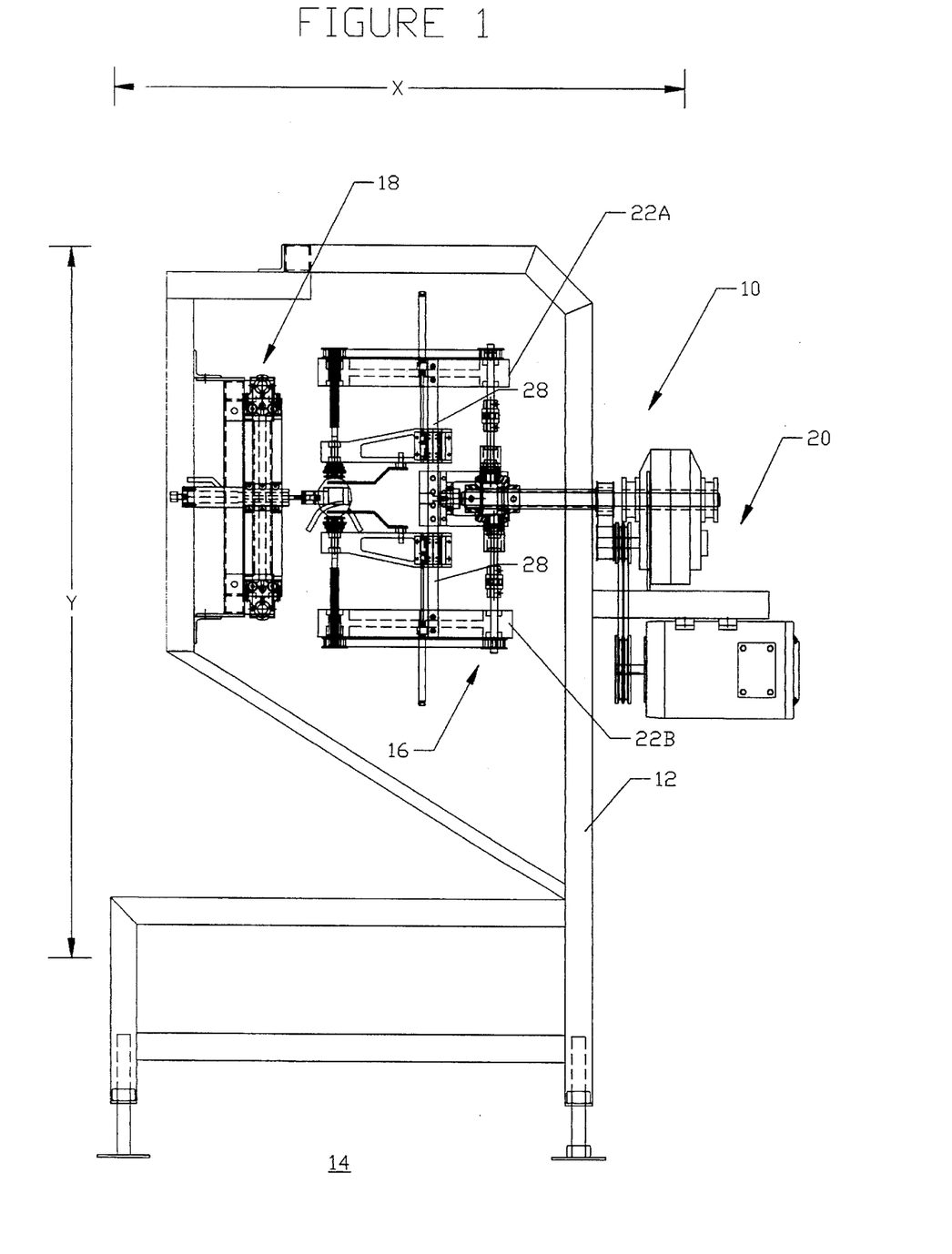
FIG. 1 is a side elevational, schematic view showing a preferred embodiment of an apparatus for removing rind from spheroidal fruits and vegetables, and particularly melons of the present invention retained in a frame.

Referring now to FIG. 1 of the drawings, there is shown generally at 10, a preferred embodiment of an apparatus for removing rind from a spheroidal food article, such as a melon, constructed according to the principles of the present invention. The invented apparatus 10 is shown secured to a frame 12 for supporting the apparatus 10.

The frame 12 preferably comprises a suitable commercial grade rigid metal alloy for supporting the apparatus 10. The frame 12 may be configured to different desired dimensions for retaining the apparatus 10 at different desired heights above a surface 14, depending upon the desired location of the apparatus 10, such as in an automated assembly line of a food processing plant (not shown) or for hand feeding of the apparatus 10, for example. Additionally, the apparatus 10 of the present invention preferably comprises suitable food grade metal alloys and polymers, as is well known in the art, so that the apparatus 10 may be used in any desired setting, such as known commercial and industrial settings.

In the preferred embodiment, the apparatus 10 comprises a carriage assembly shown generally at 16, a cutting assembly shown generally at 18, and rotating means shown generally at 20. As shown in FIG. 1, the carriage assembly 16 is in an initial position, where the assembly 16 is aligned with a first axis Y, which is preferably, but not necessarily vertical to the surface 14. The rotating means 20 is coupled to the carriage assembly 16 for rotating the assembly 16 toward a second axis X, and parallel to the Y axis (to be thoroughly discussed hereinafter).

Figure 2:
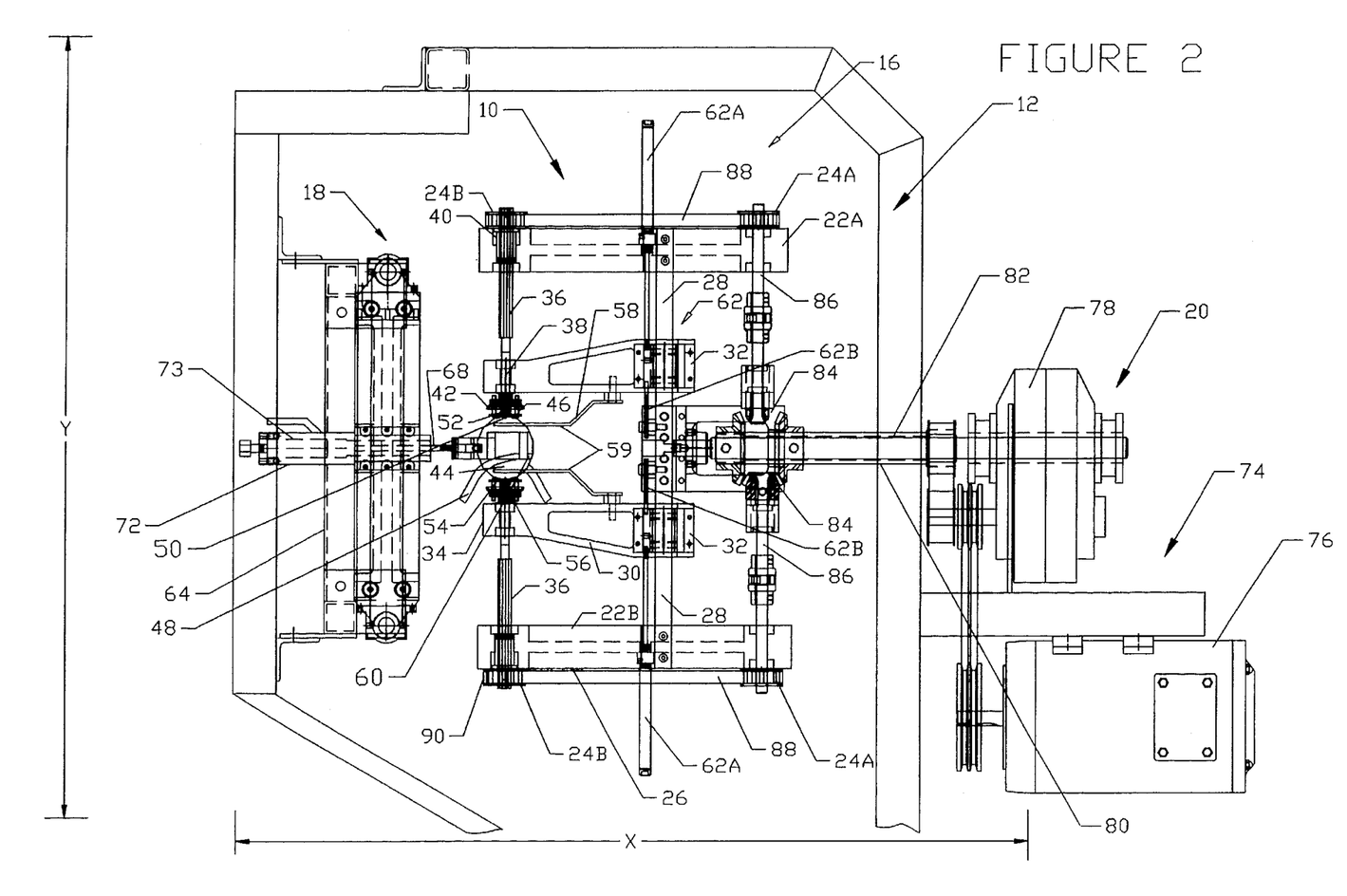
FIG. 2 is a side elevational, schematic view showing the preferred embodiment of the apparatus of the present invention.

Referring now to FIG. 2 of the drawings, the apparatus 10 of the present invention is more clearly shown. The carriage assembly 16 includes upper and lower bracket members 22A, 22B that extend perpendicular the Y axis, when the carriage assembly 16 is in the initial position. The bracket members 22A, 22B each have a primary pulley 24A and a secondary pulley 24B mounted at either end thereof, and on an outer surface 26 of the brackets 22. Guide members 28 are provided that extend between the bracket members 22 and are affixed thereto. The guide members 28 retain the brackets 22 in a predetermined spatial position.

A pair of support members 30 are interposed between the brackets 22 of the assembly 16 and extend parallel thereto. Each support member 30 has a first end 32 slidably coupled to the guide members 28, using known means, and a second end 34 adjacent to the cutting assembly 18. The brackets 22 and support members 30 comprise a suitable lightweight, rigid metal alloy, such as aluminum for example.

A pair of diametrically opposed splined spindles 36 are coupled to the support members 30 and brackets 22 and extend perpendicularly thereto. Each spindle 36 has a first end 38 journaled in the second end 34 of a support member 30, and a second end 40 slidably journaled in a secondary pulley 24B coupled to a bracket member 22. The second end 40 of each spindle 36 is coupled to a secondary pulley 24B for rotating the spindle 26, when the rotating means 20 is actuated.

The first end 38 of each spindle 36 has a cup member 42 affixed thereto, for positively coupling a melon 44 to the spindles 36. The cups 42 have a plurality of skewers 46 that extend into a rind 48 of a pole area 50 of the melon 44, for securing the melon 44 between the cups 42. The cups 42 are also provided with a spring-loaded disk member 52 having a plurality of apertures 54 disposed therethrough. A spring mechanism 56 is affixed to the disk 52 and to the cup 42. The spring mechanism 56 is adapted to push the disk 52 outwardly from the cup 42, along the skewers 46, for disengaging rind 48 from the skewers 46, after a melon 44 has had the rind 48 removed therefrom.

Figure 3:
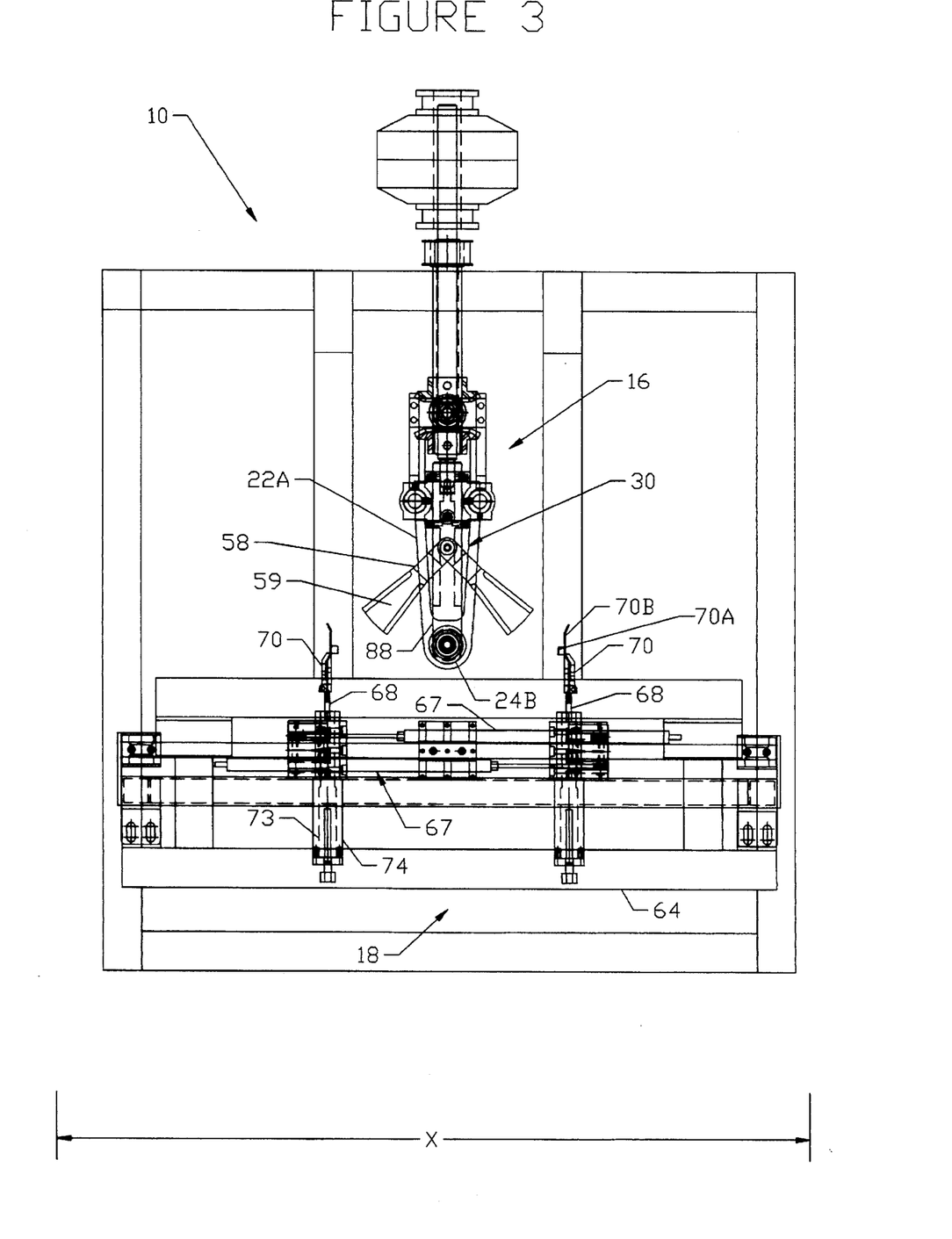
FIG. 3 is a top plan, schematic view of the present invention.

Referring now to FIG. 2 and FIG. 3 of the drawings, a pair of knife members 58 are rotatably coupled to the support members 30, adjacent to the second end 34 thereof. Each knife member 58 has a blade portion 59 configured to extend beneath the cup member 42 adjacent thereto. In use, the knife members 58 are simultaneously rotated through the poles 50 of a melon 44, retained by the cups 42, after the rind 48 has been removed therefrom. The knife members 58 disengage the melon 44 from the cups 42 of each of the spindles 36 and simultaneously remove the rind 48 from the pole 50, without removing excessive flesh 60 from the melon 44. The spring mechanism 56 then pushes the disk 52 outwardly from the cup 42, to remove any rind 48 from the skewers 46.

Referring again to FIG. 2, actuation means are shown generally at 62. The actuation means 62 are coupled to the first end 32 of each of the support members 30, for either drawing the members 30 toward each or for separating them. The actuation means 62 comprises any suitable means for drawing the support members 30 together until the spindles 36 are in an engaged position (shown in FIG. 2) and separating the support members 30, until the spindles 36 are in a retracted position. The actuation means 62 shown comprise separation means 62A, such to as a pneumatic piston coupled to the members 30, and a pneumatically actuated chain 62B for drawing the spindles 36 together. The actuation means 62 are adjustable for accommodating melons 44 of different diameters.

Figure 4:
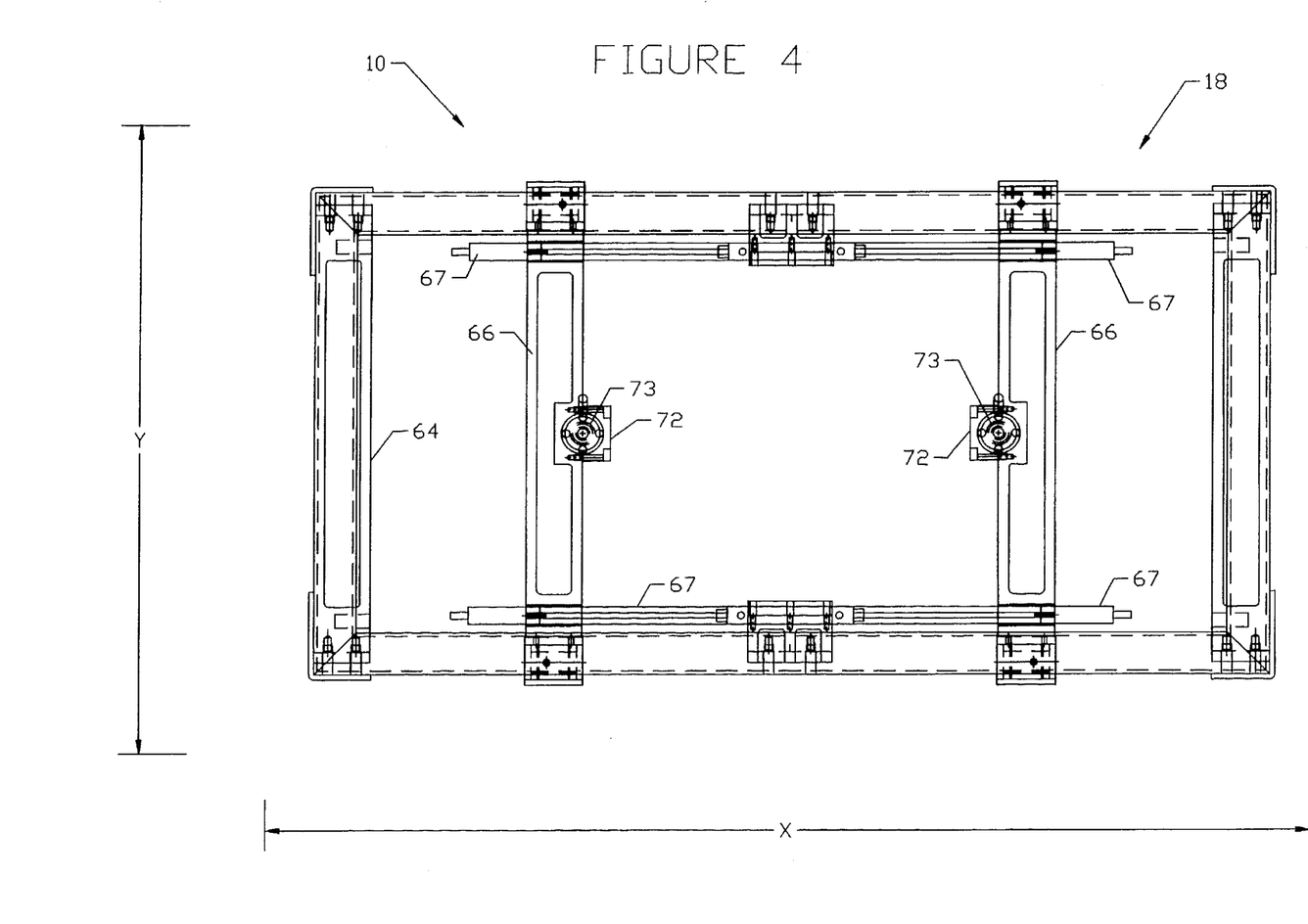
FIG. 4 is a front elevational, schematic view showing a cutting assembly of the preferred embodiment of the apparatus of the present invention.

Referring now to FIGS. 2-4 of the drawings, there is shown the cutting assembly 18 of the preferred embodiment of the invented apparatus 10 for removing rind from a spheroidal food article, such as a melon 44. The cutting assembly 18 includes a rectangular frame 64 located adjacent to the carriage assembly 16. The frame 64 includes a pair of cross members 66 that extend parallel to the Y axis and are adjustable along the X axis, for accommodating melons 44 of different diameters. Preferably, the cross members 66 are sufficiently adjustable to provide a distance ranging from approximately 4 inches to 10 inches therebetween, to accommodate melons 44 having diameters in the same range. Further, pneumatic means 67 may be coupled to the cross members 66 for automatically adjusting the distance between the cross members 66 and for centering the members 66 on the frame 64.

The cutting assembly 18 includes knife means 68 coupled to the cross members 66. The knife means 68 are provided for removing the rind 48 from a melon 44. The cross members 66 are adjusted along the frame 64, for aligning the knife means 68 to position the knife means 68 adjacent the rind 48 of melon 44 to be peeled. Each knife means 68 includes a cutting head portion 70 comprising a blade 70A and a skid member 70B. Different head portions 70 may be provided having blades 70A of different lengths. Preferably, the blade 70A is dimensioned to extend just through the rind 48 of the melon 44, without extending substantially into the flesh 60 thereof.

Additionally, the knife means 68 are preferably coupled to reciprocating means 72. The reciprocating means 72 are provided for thrusting the blade 70A of each knife means 68 through the rind 48 as the melon 44 is being revolved by the spindles 36, to aid the knife means 68 with a removing rind 48 from the melon 44. In the preferred embodiment, the reciprocating means 72 comprises at least one pneumatic piston vibrator 73 coupled to the knife means 68. The vibrator 73 preferably reciprocates the knife means 68 at a rate of approximately 3,800; cycles per minute, with a stroke length of approximately ⅜ inch. Further, the reciprocating means 72 includes pressure sensing means integrated in the vibrator 73. The pressure sensing means aids with controlling the amount of pressure applied to the rind 48 from the cutting head 70. Thus, as the rind 48 is being removed from the melon 44, the reciprocating means 72 helps to inhibit excessive flesh 60 from being removed from the melon 44.

Referring now to FIG. 2 of the drawings, the rotating means 20 is provided for rotating the carriage assembly 16 between the initial position and a completed position, where the spindles 36 extend parallel to the X axis, which is preferably, but not necessarily, horizontal to the surface 14. The rotating means 20 include drive means 74 coupled to the spindles 36 and to the brackets 22.

Preferably, the drive means 74 comprises a suitable known electronic motor 76 having an output of approximately one horsepower. The motor 76 is coupled to a differential means 78. The differential means 78 drives an outer drive shaft 80 coupled to the brackets 22 and drives an inner drive shaft 82 coupled to the spindles 36. The differential means 78 drives the inner shaft 82 at a first velocity and drives the outer shaft 80 at a second velocity. Preferably, the outer shaft 80 has substantially a 30 to 1 ratio to the inner shaft 82, such that for every 30 revolutions of the outer shaft 80, the inner shaft 82 has one revolution. Thus, for every 360° that the rotating means 20 rotates the carriage assembly 16, the spindles 36, and therefore a melon 44 coupled thereto, rotate approximately 30 times, or one complete revolution of the melon 44 for every 12° of carriage assembly 16 rotation.

The outer shaft 80 is coupled to a helical gearing assembly 84, that is coupled to a pair of secondary shafts 86. The secondary shafts 86 extend perpendicularly between the brackets 22 and are coupled to the primary pulleys 24A. A known sturdy belt 88 is secured about each of the pulleys 24A, 24B, so that the primary pulleys 24A can drive the secondary pulleys 24B. The belt 88 has a plurality of ridges along its inner periphery (not clearly seen) formed complementary to grooves 90 in the pulleys 24A, 24B, to prevent slippage between the belt and pulleys 24A, 24B.

The secondary shafts 86 are provided for rotating the carriage assembly 16 from the initial position, where it is aligned with the Y axis, to the completed position, where it is aligned with the X axis. The secondary shafts 86 are additionally coupled to the inner shaft 82 for revolving the shafts 86 about their axis, for driving the primary pulleys 24A. As the shafts 86 rotate the primary pulleys 24A, the belt 88 is driven to rotate the secondary pulleys 24B for revolving the spindles 36.

In operation, the preferred embodiment of the invented apparatus 10 for removing rind from a spheroidal food article, such as a melon, is activated using suitable known means, such as electrical, pneumatic, or hydraulic means, or desired combinations thereof. The actuation means 62 are firstly activated for separating the spindles 36 into the retracted position. A melon 44 to have the rind 48 removed therefrom is preferably placed through the cutting assembly frame 64, and interposed between the cups 42 of the spindles 36.

The actuation means 62 are again activated for drawing the spindles 36 into the engaged position, such that the cups 42 exert sufficient force on each pole 50 of the melon 44, that the skewers extend into the rind 48 and engage the melon 44. As the melon 44 is engaged by the cups 42, the cups 42 align the axis of the melon 44 with the spindles 36. The drive means 74 is then activated for rotating the carriage assembly 16 and revolving the spindles 36, and thus the melon 44. The spindles 36 and carriage assembly 16 are indexed together, for revolving the spindles 36 approximately 30 times faster than the carriage assembly 16 is rotated, as previously discussed.

As the spindles 36 begin to revolve the melon 44 on its equator E, the cutting head 70 of the knife means 68 engage the melon 44, to cut the rind 48, for removing the rind 48. As the melon 44 begins revolving, the secondary shafts 86 simultaneously begin rotating the carriage assembly 16 toward the completed position. The knife means 68 continuously engage the melon 44, while the carriage assembly 16 is being rotated from the initial position, for removing the rind 48, without removing excessive amounts of flesh 60 from the melon 44. The rotating means 20 continues to rotate the carriage assembly 16, until the assembly 16 is approximately 80° from the initial position, to an intermediate position. For this amount of rotation, the spindles 36 will have rotated the melon 44 approximately 6.6 revolutions. Thus, the knife means 68 will have removed rind 48 from approximately 220° of the melon's surface.

Once in the intermediate position, the knife means 68 are retracted from the melon 44. The rotating means 20 then rotates the carriage assembly 16 to the completed position, approximately parallel to the X axis and 90° from the initial position. The knife members 58 are then simultaneously rotated through the poles 50 of the melon 44, to disengage the melon 44 from the cups 42 and removing the remaining rind 48 on the poles 50. The knife members 58 slice through the melon's poles substantially close to the cups 42, so that excessive flesh 60 is not removed from the melon 44. The spring mechanism 56 then pushes the disk 52 outwardly from the cup 42, to remove any rind 48 from the skewers. The carriage assembly 16 is then rotated back, approximately 90° to the initial position, so that the apparatus 10 is ready to again remove find 48 from the next melon 44.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. An apparatus for removing rind from a spheroidal food article, the apparatus comprising:

carriage means for rotating the food article about a first axis passing through the food article, the carriage means including revolving means for retaining the food article on its axis and for revolving the food article on its equator, the revolving including engaging means for coupling the food article to the revolving means, support means for supporting the revolving means adjacent to the engaging means, actuation means coupled to the support means for moving the revolving means between an engaged position, wherein a food article interposed between the revolving means is engaged by the engaging means, and a retracted position, wherein a sufficient distance between the revolving means is provided for placing a food article between the revolving means and for removing a food article therefrom;

at least one peeling means for removing rind from the food article as the food article is rotated about the first axis by the revolving means, the peeling means positioned on either side of the food article and aligned with the equator thereof; and means for rotating the carriage means to rotate the first axis of the food article about a second axis, the second axis being approximately perpendicular to the first axis, wherein the rotating means rotates the carriage means from an initial position approximately 80 degrees to a completed position, the peeling means sequentially removing rind from the food article as the carriage means is rotated from the initial position to the completed position in a multiplicity of circular paths thereabout for removing rind from approximately 220 degrees of the surface of the food article.

2. An apparatus for removing rind from a spheroidal food article, the food article having an equator and an axis perpendicular to the equator, the apparatus comprising:

a carriage assembly for retaining a spheroidal food article on its axis and for revolving the food article on its equator, the carriage assembly including;

upper and lower brackets extending perpendicular a first axis when the carriage assembly is in an initial position, guide means extending between the brackets and affixed thereto, first and second supports interposed between the brackets, each of the supports having a first end slidably coupled to the guide means and a second end, revolving means for retaining the food article on its axis and for revolving the food article on its equator, the revolving means comprising a pair diametrically opposed spindles that extend parallel to the guide means, each spindle having a first end portion journaled in the second end of a support and a second end portion slidably journaled in a bracket, a second end of each spindle coupled to drive means for rotating the spindle, a first end of each spindle having a cup shaped member attached thereto:

actuation means coupled to the first end of each of the supports for drawing the supports toward each other until the spindles are in an engaged position and for separating the supports until the spindles are in a retracted position, wherein the actuation means are activated for separating the spindles into the retracted position for placing a food article between the cup members, the actuation means then activated for drawing the spindles into the engaged position, the cup members exerting force on each pole of the food article for engaging the article to align the axis of the article with the spindles for removing rind from the article, the actuation means again activated to return the spindles to the retracted position to disengage the food article upon the removal of the rind;

a cutting assembly located adjacent to the carriage assembly, the cutting assembly including knife means adapted to be positioned on either side of the food article and aligned with the equator thereof, the knife means dimensioned to extend through the rind of the food article; and rotating means for rotating the carriage assembly between the initial position and a completed position, and parallel to the first axis, wherein the revolving means revolves the food article on its equator so that the knife means initially removes rind from the food article along the equator thereof, the rotating means rotating the carriage assembly toward the completed position for rotating the food article about its axis so that the knife means continuously removes rind from the food article as the carriage assembly is rotated toward the completed position, for removing substantially the entire rind from the food article.

3. The apparatus of claim 2 wherein the drive means drives the revolving means at a first predetermined velocity and drives the rotating means at a second predetermined velocity, such that the second predetermined velocity is substantially less than the first predetermined velocity.

4. The apparatus of claim 3 wherein the first predetermined velocity is approximately thirty times faster than the second predetermined velocity.

5. The apparatus of claim 2 further comprising a pair of knife members, each knife rotatably coupled to one of the support members adjacent the second end thereof, each knife member configured to extend beneath the cup member of the spindle adjacent thereto, both knife members simultaneously rotated through each pole of a food article retained by the cup member after the rind has been removed therefrom, for disengaging the food article from the cup members of each of the spindles and for removing the rind from the pole, the knife members extending just beneath the cup members for removing the rind from the pole without removing excessive flesh from the food article.

6. The apparatus of claim 5 wherein each cup member further comprises:

a plurality of skewer members adapted to extend into the rind of the pole of the food article for coupling the food article to the cup members; and a disengagement means for removing rind retained on the skewer once the knife member has disengaged the food article from the cup member.

7. The apparatus of claim 2 wherein the cutting assembly comprises:

a frame located adjacent the carriage assembly;

adjustment means coupled to the frame, the adjustment means for aligning the knife means with the equator of a food article and for spatially positioning the knife means perpendicular to the first axis depending upon the diameter of the equator of a food article to have the rind removed therefrom; and the knife means comprising a pair of diametrically opposed knifes coupled to the adjustment means, each knife including a cutting head having a blade member dimensioned to extend through the rind of the food article and a skid member for contacting the rind of the food article for preventing the blade member from extending substantially into the flesh of the food article for preventing superfluous flesh from being removed from the food article.

8. The apparatus of claim 7 wherein the cutting assembly further comprises means for reciprocating the knife means, the reciprocating means thrusting the blade member of each knife means through the rind of the food article for removing rind therefrom, the reciprocating means including pressure sensing means for controlling the amount of pressure applied to the rind from the knife means for inhibiting excessive flesh from being removed from the food article.

9. The apparatus of claim 8 wherein the rotating means comprises:

a drive shaft coupled to the drive means and a pair of secondary shaft members, each of the secondary shaft members having a first end coupled to the drive means and a second end journaled to the bracket members and coupled to the revolving means four rotating the revolving means, the secondary shaft members extending parallel to the first axis when the carriage assembly is in the initial position; and a gearing mechanism coupled to the first end of each of the secondary shaft members and to the drive shaft, the gearing mechanism rotated by the drive shaft to rotate the secondary shaft members toward the second axis for rotating the carriage assembly between the initial position and the completed position, and parallel to the first axis, whereby the rotating means first rotates the carriage assembly from the initial position toward the completed position to an intermediate position for retracting the knife means from the food article, the rotating means then rotating the carriage assembly to the completed position for disengaging the food article from the spindles, the rotating means then rotating the carriage assembly to the initial position.

10. The apparatus of claim 9 wherein the apparatus is capable of processing spheroidal food articles having a diameter ranging from approximately 4 inches to approximately 10 inches.

11. The apparatus of claim 1 further comprising knife means for disengaging the food article from the engaging means, the knife means simultaneously rotated through each pole of a food article retained by the engaging means after the rind has been removed therefrom for disengaging the food article from the engaging means, the knife means configured to extend through the poles of the food article adjacent to the engaging means for removing the rind from the pole without removing excessive flesh from the food article.

12. The apparatus of claim 1 further comprising:

the revolving means comprising a pair of diametrically opposed spindles, each spindle having a first end portion journaled in the support means and a second end coupled to drive means for rotating the spindle;

the engaging means comprising a cup shaped member attached to the first end of each spindle, the cup shaped member having a plurality of outwardly projecting skewers configured to extend into the rind of the pole of the food article for momentarily engaging the food article for enabling the food article to be revolved by the revolving means; and disengagement means for removing rind retained on the skewers once the food article is disengaged from the cup member.

13. A method for removing rind from a spheroidal food article, the food article having an equator and an axis that extends perpendicular to the equator, the method comprising the steps of:

positioning a spheroidal food article between in a pair of revolving means, the revolving means aligned with a first axis when the revolving means are in an initial position;

engaging the food article with the revolving means and centering the food article on the revolving means so that the axis of the food article is aligned with the revolving means;

positioning a pair of cutting means on either side of the food article in alignment with the equator thereof, each cutting means engaging the food article such that the cutting means extends through the rind of the food article without extending substantially into the flesh thereof;

revolving the food article on its equator for removing rind from the food article along the equator;

rotating the food article about its axis toward a second axis, the food article rotated toward the second axis so that the cutting means continuously removes rind as the food article is rotated toward the second axis;

rotating the food article about its axis toward the second axis until substantially the entire rind is removed from the food article without removing an excessive amount of the flesh;

disengaging the cutting means from the food article;

rotating the food article about its axis until the axis thereof is aligned with the second axis;

slicing pole portions of the food article engaged by the revolving means to disengage the article therefrom; and rotating the revolving means from its alignment with the second axis until the revolving means are aligned with the first axis and in the initial position.

14. An apparatus for removing rind from a spheroidal food article, the food article having an equator and an axis perpendicular to the equator, the apparatus comprising:

a carriage assembly including revolving means and adjusting means coupled to the revolving means, the revolving means for retaining a spheroidal food article on its axis and for revolving the food article on its equator at a first velocity, the revolving means aligned with a first axis when the carriage assembly is in an initial position, the adjusting means oscillating the revolving means to engage the food article and for aligning the axis of the article with the revolving means;

a cutting assembly located adjacent to the carriage assembly, the cutting assembly including reciprocating knife means adapted to be positioned on either side of the food article and aligned with the equator thereof, the knife means comprising a pair of diametrically opposed knifes coupled to the adjustment means, each knife including a cutting head having a blade member dimensioned to extend through the rind of the food article and a skid member for contacting the rind of the food article for preventing the blade member from extending substantially into the flesh of the food article for preventing superfluous flesh from being removed from the food article; and rotating means for rotating the carriage assembly between the initial position and a completed position, and parallel to the first axis, the rotating means including drive means coupled to the revolving means and to the adjusting means, the drive means driving the revolving means at the first velocity and driving the adjusting means at a second velocity, such that the first velocity is substantially greater than the second velocity, whereby the revolving means revolves the food article on its equator so that the knife means initially removes rind from the food article along the equator thereof, the rotating means rotating the adjustment means rotating the carriage assembly from the initial position toward the completed position, the rotating means rotating the carriage assembly from the initial position to an intermediate position for rotating the food article about its axis so that the knife means continuously removes rind from the food article for removing substantially the entire rind from the article without removing excessive flesh therefrom, when the carriage assembly is in the intermediate position, the knife means being withdrawn from the food article the food article, the rotating means then rotating the carriage assembly to the completed position for disengaging the food article from the revolving means, the rotating means then rotating the carriage assembly to the initial position, such that substantially the entire rind is removed from the food article without removing excessive flesh from the food article.

15. The apparatus of claim 14 further comprising knife members rotatably coupled to the adjusting means, the knife members configured to extend beneath engaging means of the revolving means, the knife members simultaneously rotated through each pole of a food article retained by the engaging means for disengaging the food article therefrom and for removing the rind from the pole without removing excessive flesh from the food article.

16. The apparatus of claim 15 wherein engaging means includes a plurality of skewer members adapted to extend into the rind of the pole of the food article for coupling the food article to the engaging means; and a disengagement means for removing rind retained on the skewer once the knife member has disengaged the food article from the engaging means.

17. The apparatus of claim 15 wherein the cutting assembly further comprises a pneumatic piston vibrator for reciprocating the knife means, the vibrator for thrusting the blade member of each knife through the rind of the food article as the rind is being removed therefrom, the vibrator including air pressure sensing means for controlling the amount of pressure applied to the blade member from the vibrator.

18. The apparatus of claim 14 wherein the apparatus is capable of processing spheroidal food articles having a diameter ranging from approximately 4 inches to approximately 10 inches.

19. The apparatus of claim 14 wherein the first velocity is approximately thirty times faster than the second velocity.

20. A method for removing rind from a spheroidal food article, the food article having an equator and an axis that extends perpendicular to the equator, the method comprising the steps of:

positioning a spheroidal food article between in a pair of revolving means, the revolving means aligned with a first axis when the revolving means are in an initial position;

engaging the food article with the revolving means and centering the food article on the revolving means so that the axis of the food article is aligned with the revolving means;

positioning cutting means on the food article in alignment with the equator thereof, the cutting means engaging the food article to remove rind from the food article;

revolving the food article on its equator for removing rind from the food article;

rotating the food article about its axis toward a second axis until substantially the entire rind is removed from the food article;

rotating the food article about its axis until the axis thereof is aligned with the second axis;

slicing poles of the food article engaged by the revolving means to disengage the article from the revolving means; and rotating the revolving means from its alignment with the second axis until the revolving means are aligned with the first axis.

* * * * *